Patented Dec. 1, 1925.

1,564,156

UNITED STATES PATENT OFFICE.

LOUIS F. VOGT, OF WASHINGTON, PENNSYLVANIA, ASSIGNOR TO STANDARD CHEMICAL COMPANY, OF PITTSBURGH, PENNSYLVANIA, A CORPORATION OF DELAWARE.

PROCESS OF MAKING FERROVANADIUM.

No Drawing. Application filed December 26, 1924. Serial No. 758,090.

*To all whom it may concern:*

Be it known that I, LOUIS F. VOGT, a citizen of the United States, residing at Washington, Washington County, Pennsylvania, have invented a new and useful Improvement in Processes of Making Ferrovanadium, of which the following is a full, clear, and exact description.

My invention relates to the manufacture of ferro-vanadium, and is designed to improve the recovery of vanadium and to produce an alloy of relatively low melting point and containing certain desirable constituents.

The process may be carried out in any furnace utilizing the exothermic nature of the reactions; but I prefer to use therefor an electric furnace of the arc type with basic refractory lining, and to employ a current of over 100 volts.

In starting the process, crushed vanadium slag, preferably "tapping" slag, taken from the final step of my process, is charged into the furnace, together with relatively pure iron, such as mild steel scrap. When this charge becomes fused, a mixture of finely divided lime and finely divided ferro-silicon is added, the amount of silicon being greatly in excess of that theoretically required to completely reduce the vanadium contained in the fused bath. By the term "ferro-silicon", I mean any iron alloy of silicon up to 95% of silicon content.

This method of introducing ferro-silicon is of special advantage since it gives a longer and more efficient contact of the ferro-silicon with the slag and the vanadium contained therein, and promotes an even distribution of the reducing and fluxing agents over the bath. The spread-on mixture gradually fuses and feeds down through the bath reducing the vanadium as it descends gradually into the molten iron at the bottom. When the ferro-silicon has settled to the bottom, it is nearly inactive towards the vanadium in the slag; and this step is much more efficient than when the reducing agent is mixed with a cold charge and the temperature then raised to fuse the charge.

A recovery of 95% or more of the vanadium in the slag is often attained by my process thus carried out. The large excess of silicon present (of the order of several hundred percent) collects in the metal at the bottom of the furnace, along with the vanadium silicide formed by the reducing action. The overlying slag when nearly free of vanadium is skimmed and removed, the metal silicides remaining in the furnace.

This treatment of vanadium slags may be repeated as often as desirable and without removing the molten metal bath.

The excess of lime used as described is more than sufficient to combine with the silica liberated by the oxidation of the silicon during the reaction. This lime acts to increase the fluidity of the slag bath and protect the furnace linings from rapid attack. It also has been found of advantage to add iron oxide (preferably mill scale) to the metal at the bottom of the bath, when repeating the slag treating operation, in order to lower the silicon content somewhat.

When the slag-treating operations as described have been finished, vanadium-containing material, preferably high grade vanadium oxide, together with finely divided lime is charged in and upon the molten bath of metal silicides. As the rich mixture fuses, the vanadium is in part reduced by the violent reaction with the molten silicides. Apparently only the excess ferro-silicon enters into this reaction, so that the metal still remains largely silicides and the vanadium oxide of the bath is in part reduced.

During this reaction, the electric current may be largely reduced, as the reaction is highly exothermic.

A mixture of finely divided ferro-silicon and lime is now added to the bath, which mixture contains substantially less silicon than is required to reduce all of the vanadium contained in the bath. During the ensuing reaction, sufficient vanadium is thereby reduced to raise the vanadium content of the metal to the desired percentage for commercial ferro-vanadium, without increasing the silicon content of the metal to an undesirable degree. At this stage, I purposely maintain a bath containing incompletely reduced vanadium.

I have also found that in this stage the silicon content of the metal may be further regulated by the judicious use of mill scale, to obtain its oxidizing effect on the excess silicon; and such additions have other beneficial effects on the operation.

The high vanadium slag is then skimmed off, and in part is tapped with the metal, this constituting the high vanadium "tapping" slag for the first charge of the succeeding heat. The metal is tapped into buggies where it is solidified, then separated from the accompanying slag and crushed to desired size.

The ferro-vanadium so produced will preferably contain approximately 35% vanadium; 3.50% silicon, and less than .5% carbon. It will be exceptionally low in sulphur and phosphorous with reasonable control of raw materials.

The silicon content of the ferro-vanadium produced may be higher or lower than the preferred percentage with a corresponding increase or decrease in the vanadium silicide content of the alloy, provided sufficient silicon is contained to produce a substantial percentage of vanadium silicide in the alloy. For this purpose, more than 1% silicon content is assumed.

The advantages of my invention will be apparent to those skilled in the art, since an efficient and economical method is afforded by which vanadium-containing slags may be worked up and the vanadium content of the resultant silicide metal increased by the oxidizing action of the bath of vanadium oxide.

Changes may be made in the steps and other materials may be added without departing from my invention.

I claim:

1. In the manufacture of ferro-vanadium, the steps consisting in forming a molten bath having thereon a slag layer containing vanadium compounds, and spreading on the top of the slag layer finely divided lime-containing fluxing material together with a finely divided silicon-containing reducing agent whereby the mixture fuses and the reducing agent gradually descends through the slag layer reducing vanadium therefrom as it descends.

2. In the manufacture of ferro-vanadium, the steps consisting of forming a molten metal bath having thereon a slag layer containing vanadium compounds, feeding into said slag layer a finely divided silicon-containing reducing agent in excess of that theoretically required to completely reduce the vanadium compounds in the slag layer together with finely divided lime-containing fluxing material in excess of that required to combine with the silica liberated by the oxidation of the silicon, whereby vanadium is recovered from the slag and a silicon-containing metal bath is formed, and thereafter feeding vanadium-containing compounds into said bath and reducing vanadium from said compounds by means of the silicon in the bath.

3. In the manufacture of ferro-vanadium, the steps consisting of forming a molten metal bath having an iron-containing metal layer and a supernatant layer of slag containing oxidized vanadium compounds, feeding into said slag layer a finely divided silicon-containing reducing agent in excess of that theoretically required to completely reduce the vanadium compounds in the slag layer together with finely divided lime-containing fluxing material, removing the thus treated slag, charging further slagging material containing vanadium compounds and repeating the treatment with the silicon-containing reducing agent and lime-containing fluxing material, whereby vanadium is reduced from the slag and a silicon-containing metal layer is formed, and adding iron oxide to the bath to lower the silicon content as desired.

4. In the manufacture of ferro-vanadium, the steps consisting of forming a bath containing iron and silicon, charging vanadium compounds and lime-containing fluxing material into the bath, and thereafter charging into the bath a silicon-containing reducing material in an amount less than that required to reduce all of the vanadium compounds contained in the bath.

5. In the manufacture of ferro-vanadium, the steps consisting in forming a bath containing iron and silicon, charging into said bath vanadium compounds and lime-containing fluxing material, and thereafter charging into the bath a silicon-containing reducing material in an amount less than that required to reduce all of the vanadium compounds contained in the bath, and regulating the silicon content of the ferro-vanadium thus produced by the addition of iron oxide.

6. In the manufacture of ferro-vanadium, the steps consisting of forming a molten bath having an iron-containing metal layer and a supernatant layer of slag from a previous operation containing oxidized vanadium compounds, feeding into said slag layer finely divided lime-containing fluxing material together with an excess of a finely divided silicon-containing reducing agent, whereby vanadium is reduced from the slag layer and added to the metal layer and silicon is also added to the metal layer, removing the thus treated slag and charging further slag material containing oxidized vanadium compounds from a previous operation, and repeating the treatment with the fluxing material and reducing agent, until an iron-containing metal layer is formed containing the desired amount of vanadium together with an excess of silicon, charging into such metal bath oxidized vanadium compounds together with a lime-containing fluxing material, whereby a partial reduction of the oxidized vanadium compounds is effected, and thereafter charging into the bath a silicon-containing reducing agent in an amount less than that required to reduce all of the oxidized vanadium compounds in the bath.

7. In the manufacture of ferro-vanadium, the steps consisting of forming a molten bath having an iron-containing metal layer and a supernatant layer of slag from a previous operation containing oxidized vanadium compounds, feeding into said slag layer a finely divided silicon-containing reducing agent in excess of that theoretically required to completely reduce the oxidized vanadium compounds in the slag layer together with finely divided lime-containing fluxing material in excess of that required to combine with the silica liberated by the oxidation of the silicon, whereby vanadium is reduced from the slag layer and added to the metal layer and silicon is also added to the metal layer, removing the thus treated slag and charging further slag material containing oxidized vanadium compounds from a previous operation, repeating the treatment with the reducing agent and fluxing material together with the addition of iron oxide until an iron-containing metal layer is formed containing the desired amounts of vanadium and silicon, charging into such metal bath oxidized vanadium compounds together with a lime-containing fluxing material whereby a partial reduction of the oxidized vanadium compounds is effected, and thereafter charging into the bath a silicon-containing reducing agent in an amount less than that required to reduce all of the oxidized vanadium compounds in the bath and also charging iron oxide to regulate the silicon content of the finished ferro-vanadium.

In testimony whereof, I have hereunto set my hand.

LOUIS F. VOGT.